United States Patent
Cho

[11] Patent Number: 5,916,258
[45] Date of Patent: Jun. 29, 1999

[54] GAX AQUA ABSORPTION TYPE HEAT PUMP

[75] Inventor: Hyeon-Cheol Cho, Seoul, Rep. of Korea

[73] Assignee: LG Electronics Inc., Rep. of Korea

[21] Appl. No.: 08/820,050

[22] Filed: Mar. 18, 1997

[30] Foreign Application Priority Data

Mar. 26, 1996 [KR] Rep. of Korea .................. 96-8442

[51] Int. Cl.⁶ ................................................. F25B 15/00
[52] U.S. Cl. ............................................. 62/476; 62/489
[58] Field of Search ......................... 62/476, 101, 483, 62/484, 486, 489, 494

[56] References Cited

U.S. PATENT DOCUMENTS

| | | | |
|---|---|---|---|
| 5,157,942 | 10/1992 | Dao | 62/476 |
| 5,490,393 | 2/1996 | Fuesting et al. | 62/101 |
| 5,557,946 | 9/1996 | Sugiyama et al. | 62/476 |
| 5,579,652 | 12/1996 | Phillips et al. | 62/476 |

*Primary Examiner*—William Doerrler
*Attorney, Agent, or Firm*—Ostrolenk, Faber, Gerb & Soffen, LLP

[57] ABSTRACT

An improved heat pump including a first tube branched from a tube connected between a solution pump and a rectifier, for making a pressure-elevated strong solution introduced into a solution cooled absorber and the rectifier respectively by a constant amount, wherein heat-exchanged strong solution in the rectifier joins with a strong solution introduced into the solution cooled absorber, a second tube for making the heat-exchanged strong solution introduced from the absorber through the first tube introduced into a distributing plate at the upper portion of an analyzer; a third tube for introducing a refrigerant vapor generated by heat exchanging the strong solution introduced from the first tube to a GAX absorber/regenerator with weak solution of high temperature dropped from the distributing plate placed at the upper portion of the absorber, into a regenerator, and a fourth tube for heat-exchanging a portion of refrigerant introduced from an evaporator to the absorber with the refrigerant vapor introduced from the rectifier to a condenser and for guiding the heat-exchanged refrigerant vapor to the lower portion of the GAX absorber/regenerator in order to obtain high concentrated refrigerant vapor.

8 Claims, 2 Drawing Sheets

GAX AQUA ABSORPTION TYPE HEAT PUMP

BACKGROUND OF THE INVENTION

1. Field of the Invention

The present invention relates to an ammonia GAX aqua absorption type cycle, and more particularly to an ammonia GAX aqua absorption type cycle capable of rectifying a portion of a refrigerant vapor evaporating from an evaporator into a highly concentrated refrigerant vapor by a rectifier and absorbed well into a weak solution, to thus enhance the absorption efficiency of the GAX absorber/regenerator.

2. Description of the Related Art

Generally, a heat exchanger having a regenerator and an absorber in a heat pump is referred to as a generator absorber heat exchanger (GAX).

FIG. 1 is a simplified diagram of an ammonia GAX aqua absorption type cycle according to the conventional art.

Referring to FIG. 1, the conventional heat pump of an ammonia aqua absorption type includes an absorber 4 having a water cooled absorber 8, a solution cooled absorber 9, and a GAX absorber 7, a solution pump 11 elevating pressure of a strong solution made by the absorber 4, a regenerator 1 where the pressure-elevated strong solution is introduced, a burner 14 for heating the regenerator 1, an expansion valve 13 for expanding the weak solution from the regenerator 1 to the absorber 7, a rectifier 5 for rectifying a refrigerant vapor obtained by heating the regenerator 1, a condenser 2 where the rectified refrigerant vapor is introduced, an evaporator 3 where the refrigerant condensed by the condenser 2 is introduced, and a refrigerant heat exchanger 10 for heat exchanging the refrigerant evaporated by the evaporator 3 with the refrigerant condensed by the condenser 2. Symbol 12 is not described in FIG. 1 and is a circulating pump.

Generally, a high concentrated ammonia aqueous solution (hereinafter referred to as strong solution) is made by the absorber 7 and is elevated in pressure by the solution pump 11. Afterwards, the pressure-elevated strong solution exchanges heat with a low concentrated ammonia aqueous solution (hereinafter referred to as weak solution) dropped from upper portion of the solution cooled absorber 9. The heat-exchanged weak solution is then introduced into the regenerator 1 with high pressure. The introduced weak solution is heated by the burner 14, thereby generating a refrigerant vapor. The generated refrigerant vapor is rectified to the refrigerant vapor with high concentration by the rectifier 5 and is then transferred to the condenser 2. The transferred refrigerant vapor is condensed by a chilled water passing through a tube of the condenser 2. The condensed liquid refrigerant is introduced into the evaporator 3 and is then evaporated by the chilled water in the evaporator 3. Thereafter, the evaporated refrigerant exchanges heat with the liquid refrigerant condensed by the condenser 2 and is then again introduced to the absorber 4.

Meanwhile, the weak solution obtains a driving force from a pressure difference between the regenerator 1 in high pressure state and the absorber 4 in low pressure state, thereby returning to the upper portion of the absorber 4 through the regenerator 1 and the expansion valve 13. The strong solution is made in the absorber 4 through the absorption process between the weak solution dropped from the upper portion and the refrigerant vapor generated from the evaporator 3.

The above-mentioned conventional GAX has utilized an inner heat transfer medium so as to transfer the heat of the absorber 7 to the regenerator 1 and has utilized the circulating pump 12 so as to circulate the heat transfer medium. In addition, the chilled water was used when the refrigerant vapor generated from the generator 1 was rectified in the rectifier 5.

In the conventional GAX of heat pump of ammonia aqua absorption type, the refrigerant vapor introduced from the evaporator 3 to the absorber 4 is absorbed to the weak solution by being elevated in height, thereby forming the strong solution. At this time, purity of the refrigerant is lowered as the refrigerant vapor is elevated in height to the upper portion of the absorber 4 through heat exchange with the water cooled absorber 8, and the solution cooled absorber 9. As a result, the GAX absorber 7 is unable to perform its necessary absorbing function, thus lowering the efficiency of the system.

SUMMARY OF THE INVENTION

Accordingly, it is an object of this invention to provide a GAX aqua absorption type heat pump capable of enhancing the absorption efficiency by separating a selected amount of refrigerant vapor evaporated from the evaporator and then making the separated amount of refrigerant vapor with high purity state absorbed in the weak solution of GAX part.

According to the present invention, a GAX aqua absorption type heat pump having an absorbing part having a water cooled absorber, a solution cooled absorber, and a GAX absorber/regenerator, a solution pump for enhancing pressure of a strong solution made from the absorbing part to a selected one, a regenerator where the pressure-elevated strong solution is introduced, a burner for heating the regenerator, a rectifier for rectifying a refrigerant vapor generated from heating of the introduced refrigerant, a condenser where the rectified refrigerant vapor is introduced, and an evaporator where a refrigerant condensed by the condenser is introduced, wherein an improved heat pump further includes:

A first tube branched from a tube connected between the solution pump and the rectifier, for making the pressure-elevated strong solution introduced into the solution cooled absorber and the rectifier respectively by a constant amount, wherein heat-exchanged strong solution in the rectifier joins with a strong solution introduced into the solution cooled absorber;

A second tube for making the heat-exchanged strong solution introduced from the absorber through the first tube introduced into a distributing plate at the upper portion of an analyzer; and a third tube for introducing a refrigerant vapor generated by heat-exchanging the strong solution introduced from the first tube to the GAX absorber/regenerator with the weak solution of high temperature dropped from the distributing plate placed at the upper portion of the absorber, into the regenerator.

BRIEF DESCRIPTION OF THE DRAWINGS

Further objects and advantages of the present invention will be apparent from the following description, reference being had to the accompanying drawings wherein preferred embodiment of the present invention is clearly shown.

In the drawings.

DETAILED DESCRIPTION OF THE INVENTION

Hereinbelow, an ammonia GAX aqua absorption type heat pump according to one specific embodiment of the present invention will be described with reference to FIG. 2.

Figure 1:
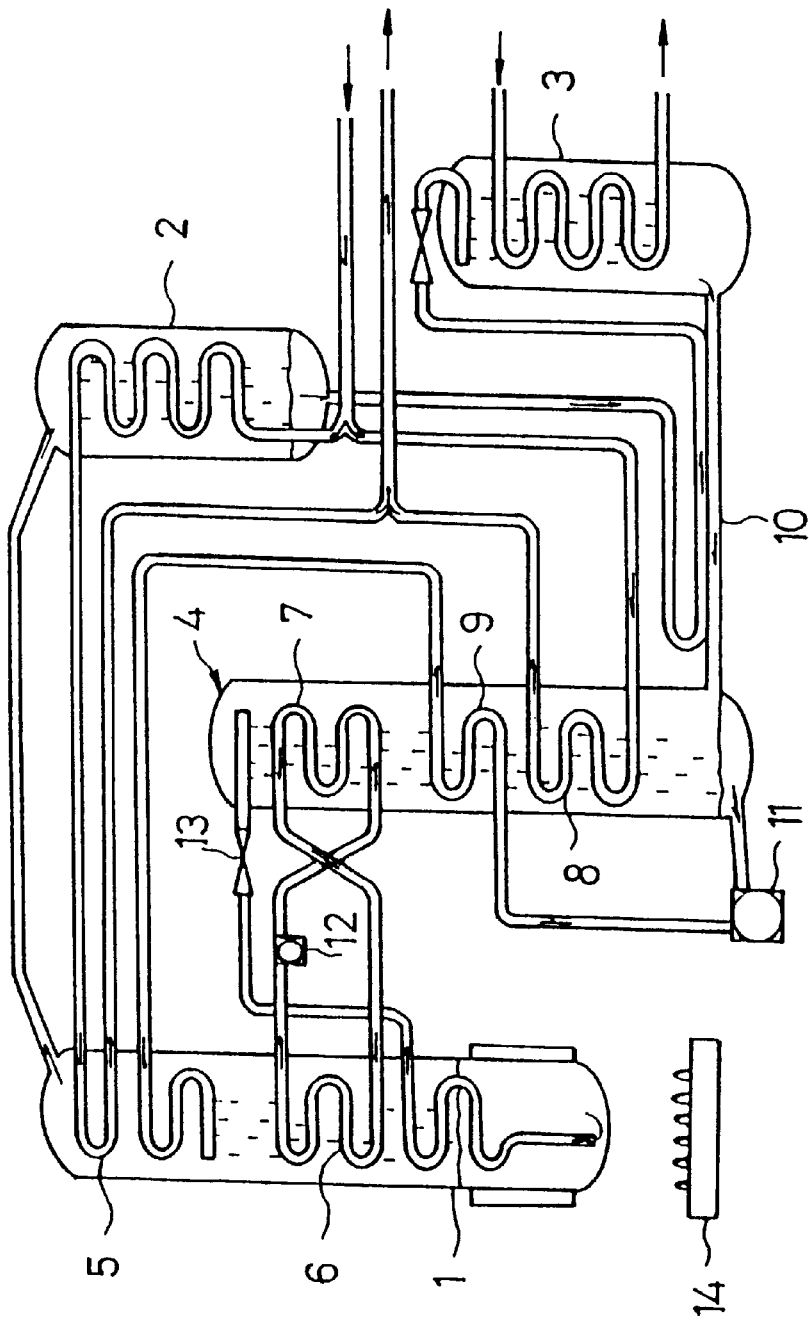
FIG. 1 is a simplified diagram of an ammonia GAX aqua absorption type cycle according to the conventional art.
Figure 2:
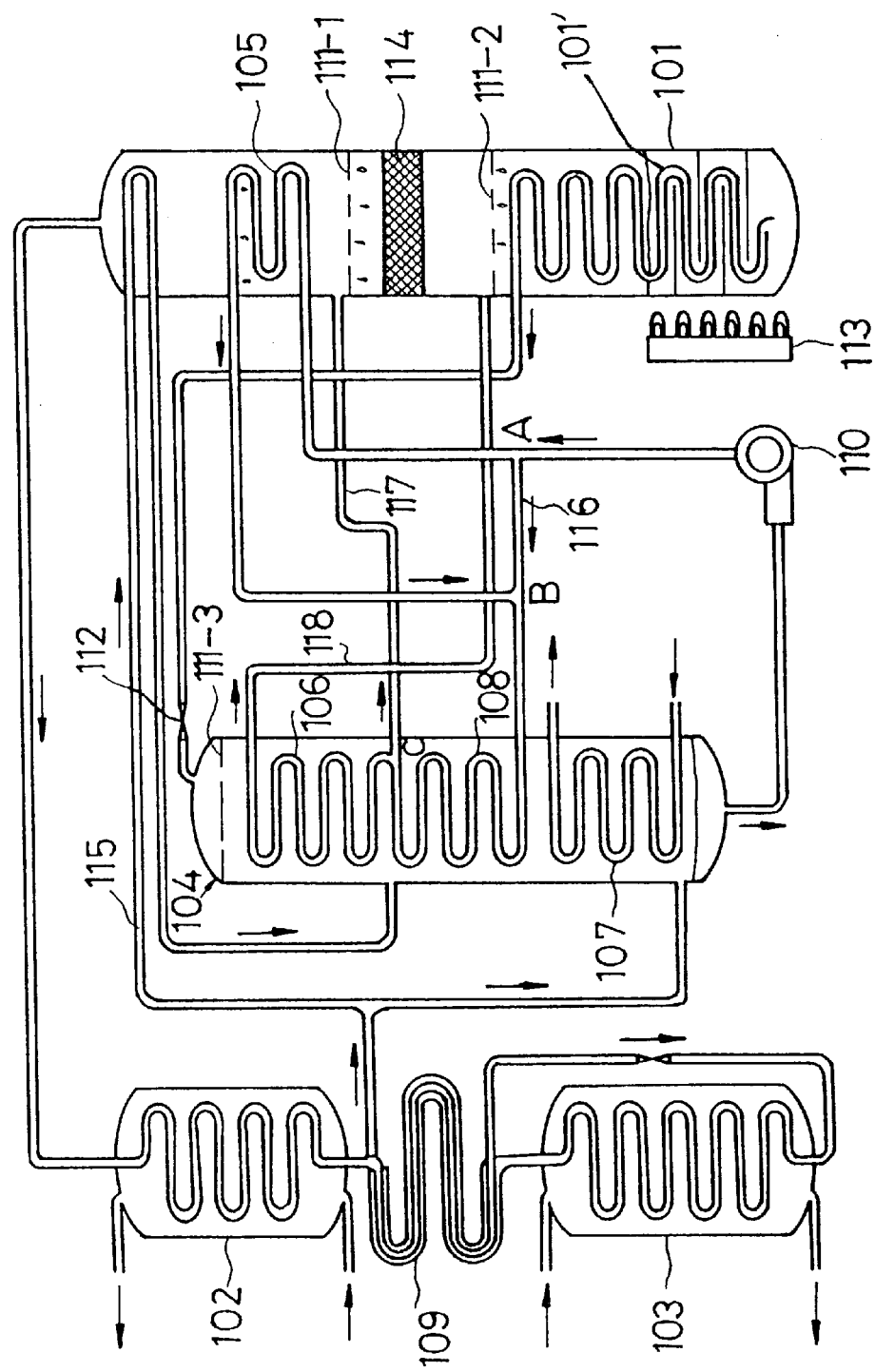
FIG. 2 is a simplified diagram of an ammonia GAX aqua absorption type cycle according to one specific embodiment of the present invention.

FIG. 2 is a simplified diagram of an ammonia GAX aqua absorption type heat pump according to one specific embodiment of the present invention.

Referring to FIG. 2, an ammonia aqua absorption type heat pump generally includes an absorber 104 having a water cooled absorber 107, a solution cooled absorber 108, and a GAX absorber/regenerator 106, a regenerator 101 where a strong solution made by the absorber 104 and pressure-elevated by a solution pump 110 is introduced, a rectifier 105 for rectifying a refrigerant vapor being generated by heating the regenerator 101 by a burner 113, a condenser 102 where the rectified refrigerant vapor is introduced, and an evaporator 103 where a refrigerant condensed by the condenser 102 is introduced.

In addition, the ammonia aqua absorption type heat pump further includes a first tube 116 branched from a tube connected between the solution pump 110 and the rectifier 105, for making the pressure-elevated strong solution introduced at the point A, into the solution cooled absorber 108 and the rectifier 105, respectively by a constant amount, wherein heat exchanged strong solution in the rectifier 105 joins at the point B, with a strong solution introduced into the solution cooled absorber 108, a second tube 117 for making the heat exchanged strong solution introduced from the absorber 104 through the first tube 116 introduced into a first distributing plate 111-1 at the upper portion of an analyzer 114, a third tube 118 for introducing a refrigerant vapor generated by heat-exchanging the strong solution introduced from the first tube 116 to the GAX absorber/regenerator 106 with a weak solution of high temperature dropped from the distributing plate 111-3 placed at the upper portion of the absorber 104, into the regenerator 101, and a fourth tube 115 for heat exchanging a portion of refrigerant introduced from the evaporator 103 to the absorber 104 with the refrigerant vapor introduced from the rectifier 105 to the condenser 102 and for guiding the heat-exchanged refrigerant vapor to the lower portion of the GAX absorber/regenerator 106 in order to obtain a high concentrated refrigerant vapor.

Operation and effect will be described with reference to FIG. 2.

When the regenerator 101 is heated by the burner 113, a strong solution, an acting solution, in the regenerator 101 is transformed into a refrigerant vapor and a weak solution. The transformed refrigerant vapor rises and is then introduced via the analyzer 114 into the rectifier 105. The introduced refrigerant vapor is pumped by the solution pump 110, thereby exchanging heat with the strong solution introduced into the rectifier 105. Also the strong solution exchanges heat with a refrigerant vapor evaporated from the evaporator 103, is then introduced into the rectifier 105 via the fourth tube 115, and condensed water evaporated together with the refrigerant vapor, whereby the refrigerant vapor generated from the regenerator 101 is rectified into a high concentrated refrigerant vapor.

The weak solution generated from the regenerator 101 sinks to the lower portion because of its high specific gravity. The weak solution flows along a weak solution coil 101 established in the regenerator 101 by a pressure difference between the regenerator 101 of high pressure part and the absorber 104 of low pressure part. The flowed weak solution expands in the expansion valve 112, is introduced into the absorber 104, is dropped upon a third distributing plate 111-3, and is uniformly distributed into the absorber 104.

The high concentrated refrigerant vapor rectified by the regenerator 101 is introduced into the condenser 102, and is then condensed to liquid refrigerant through heat exchange with temperature-dropped cool water by the introduction into the condenser 102 wherein the temperature of the cool water is lower than that of the refrigerant vapor. Thus, the refrigerant vapor changes into a liquid state due to the receiving thermal energy passed on from the refrigerant vapor to the cool water. Next, the condensed liquid refrigerant is introduced into the evaporator 103 and then again vaporized to refrigerant vapor through heat exchange with temperature-raised chilled water by the introduction into the evaporator 103 wherein the temperature of the chilled water is higher than that of the refrigerant by the evaporator. Thus, the liquid refrigerant changes into a vapor state due to receiving thermal energy passed on from the chilled water.

The refrigerant vapor vaporized by the evaporator 103 drops the temperature of the liquid refrigerant to a temperature being close to the vaporization temperature in the evaporator 103 and raises the temperature of the refrigerant vapor to a temperature being close to the saturation temperature in the absorber 104 through heat exchange with the liquid refrigerant condensed by the condenser 102 in the refrigerant heat exchanger 109, thereby accelerating the absorption phenomenon. In addition, it vaporizes a very small amount of refrigerant which is not vaporized in the evaporator 103.

The temperature of the refrigerant vapor vaporized from the evaporator 103 is increased when it is introduced into the absorber 104 after having finished its heat exchange at the refrigerant heat exchanger 109; however, the temperature of the refrigerant vapor drops after making its heat exchange at the water cooled absorber 107 where water is flowing after being dropped of its temperature. A part of the refrigerant vapor flowing in the branched fourth tube 115, is transformed into a high temperature refrigerant vapor through heat exchange with the vapor refrigerant introduced from the rectifier 105 to the condenser 102, and then introduced into the lower portion of the GAX absorber/regenerator 106 with the introduction of a portion of heat exchanged refrigerant vapor in the rectifier 105 directly into the lower part of the GAX absorber/regenerator 106 after being branched from the evaporator 103, the absorption efficiency of the GAX absorber/regenerator is thus improved.

The refrigerant vapor introduced directly from the evaporator 103 to the absorber 104 and the high temperature refrigerant vapor introduced into the absorber 104, through heat exchange in the rectifier 105, are absorbed in the weak solution which is created in the regenerator 101 and is then introduced into the absorber 104. As a result, the weak solution is transformed into the strong solution of the initial concentration.

In order to promote the absorption of the refrigerant vapor into the weak solution, the strong solution created in the absorber 104 rises up, is introduced into the rectifier 105, exchanges heat with the refrigerant vapor created in the regenerator 101, continues to flow, flows into the branched tube at the point A by pumping of the solution pump 110, joins with a part of the strong solution flowing in the first tube 116 at point B, and lastly is introduced into the absorber 104.

The strong solution introduced into the absorber 104, with flowing in the first tube 116, is transformed into the high temperature strong solution through heat exchange high temperature weak solution introduced into the absorber 104, flows in the branched tube at point "C". A part of the strong solution flows in the second tube 117, is introduced into the first distributing plate 111-1, established at the upper portion of the analyzer 114, and is then uniformly distributed.

The strong solution flowing in another tube branched at point "C" is introduced into the GAX absorber/regenerator 106, flows in the inside, exchanges heat with the weak solution introduced into the absorber 104, and is then transformed into the high temperature weak solution. The high temperature strong solution flowing in the GAX absorber/regenerator 106 is transformed into the refrigerant vapor by the absorption heat of the weak solution introduced into the absorber 104 and the refrigerant vapor introduced from the evaporator 103 to the absorber 104, flows in the third tube 118, and is then introduced up to a second distributing plate 111-2 placed at the upper portion of the regenerator 101 with high pressure.

In cooling operation of the ammonia aqua absorption type heat pump, temperature-dropped cool water is sent to the indoor unit of the air conditioner, and then cools air in indoor room. Temperature-dropped cool water by cooling the condenser 102 and the absorber 104 is sent to the outdoor unit of the heat pump, and is then again cooled.

In heating operation of the ammonia aqua absorption type heat pump, contrary to the above-mentioned operation, temperature-elevated cool water flowing in the condenser 102 and absorber 104 is sent to the indoor unit of the air conditioner, warms air in the indoor room. Temperature of the chilled water passing through the evaporator 103 is sent to the outdoor unit.

The above-mentioned operation is continuously performed with being circulated in a equilibrium state during the operation of the system.

As described previously in detail, the present invention obtains more effective absorption heat from the GAX heat exchanger by introducing a refrigerant vapor of high purity onto the branched tubes.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. In a heat pump of GAX aqua absorption type which includes an absorbing part having a water cooled absorber, a solution cooled absorber, and a GAX absorber/regenerator, a solution pump for enhancing the pressure of a strong solution made from the absorbing part to a selected pressure, a regenerator for receiving the pressure-elevated strong solution, a burner for heating the regenerator, a rectifier connected to the solution pump by a tube, the rectifier for rectifying a refrigerant vapor generated from heating of the introduced refrigerant, a condenser for receiving the rectified refrigerant vapor, and an evaporator for receiving a refrigerant condensed by the condenser, the heat pump further comprising:

a first tube branched from the tube connected between the solution pump and the rectifier, for introducing a constant amount of the pressure-elevated strong solution into the solution cooled absorber and the rectifier, wherein strong solution heat exchanged in the rectifier joins with a strong solution introduced into the solution cooled absorber;

a second tube for introducing the heat-exchanged strong solution from the solution cooled absorber into a distributing plate at the upper portion of an analyzer; and a third tube for introducing a refrigerant vapor generated by heat-exchanging the strong solution introduced from the first tube to the GAX absorber/regenerator with weak solution of high temperature dropped from the distributing plate at the upper portion of the absorbing part, into the regenerator.

2. The heat pump in accordance with claim 1, wherein the improved heat pump further comprises a fourth tube for heat-exchanging a portion of refrigerant introduced from the evaporator to the absorbing part with the refrigerant vapor introduced from the rectifier to the condenser and for guiding the heat-exchanged refrigerant vapor to the lower portion of the GAX absorber/regenerator in order to obtain high concentrated refrigerant vapor.

3. The heat pump in accordance with claim 2, wherein the fourth tube is branched from a refrigerant path tube connected between the evaporator and the absorbing part, the refrigerant path tube being connected to the lower portion of the absorbing part.

4. The heat pump in accordance with claim 1, wherein the analyzer is established between the rectifier and the regenerator, and the distributing plate is respectively established at the upper portion and lower portion of the analyzer.

5. A heat pump comprising:

an absorber including a water cooled absorber, a generator absorber heat exchanger (GAX) and a solution cooled absorber;

a rectifier;

a first pipe coupling the solution cooled absorber to the rectifier and conducting a strong solution;

a second pipe coupling the first pipe and the rectifier to the solution cooled absorber;

an analyzer;

a distribution plate disposed above said analyzer;

a third pipe coupled to the solution cooled absorber and introducing the strong solution from the solution cooled absorber onto the distribution plate;

a regenerator;

a fourth connecting path coupling the GAX to the regenerator;

a condenser coupled to the rectifier; and an evaporator coupled to the condenser and coupled to the absorber.

6. A heat pump as set forth in claim 5, further comprising a fifth pipe connecting the evaporator to the GAX.

7. A heat pump as set forth in claim 6, wherein the fifth pipe includes a heat exchanger in the rectifier.

8. A heat pump as set forth in claim 7, further comprising a solution pump coupled to the first pipe and elevating the pressure of the strong solution conducted by the first pipe.

* * * * *